Nov. 7, 1961   B. STORSAND   3,008,080
TRANSFORMER FOR HEAVY DUTY RECTIFIER EQUIPMENT
Filed Dec. 2, 1958   3 Sheets-Sheet 1

INVENTOR:
BJARNE STORSAND
by
Frederick Breitenfeld
Attorney

United States Patent Office 3,008,080
Patented Nov. 7, 1961

3,008,080
TRANSFORMER FOR HEAVY DUTY
RECTIFIER EQUIPMENT
Bjarne Storsand, Watt, Switzerland, assignor to Oerlikon Engineering Company, Zurich, Switzerland, a corporation of Switzerland
Filed Dec. 2, 1958, Ser. No. 777,707
Claims priority, application Switzerland Dec. 2, 1957
1 Claim. (Cl. 321—27)

This invention relates to a transformer for heavy duty rectifier equipment in which single valves with comparatively low rated current, in particular single-crystal semiconductor valves, are used.

Figure 1:
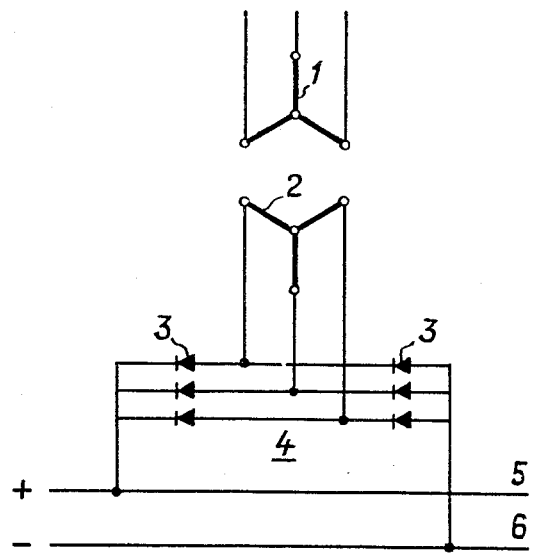
FIG. 1 is a diagrammatic view of a conventional three-phase rectifier circuit.
Figure 2:
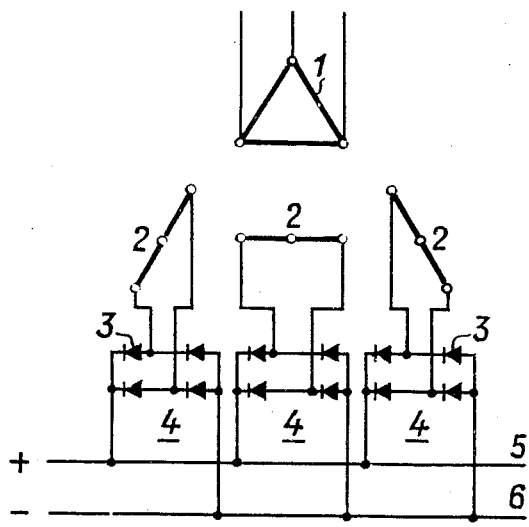
FIG. 2 is a diagrammatic view of a conventional six-phase rectifier circuit.

It is already known that valve sets can be built up in the form of full-wave Graetz circuits such as, for example, as shown in the first two figures of the drawing. In FIG. 1, 1 is the primary winding of a transformer, 2 its secondary winding. The individual valves are denoted by 3, the entire set of valves by 4, and 5 and 6 are the direct-current rails. FIG. 2, in which similar parts are shown with the same reference symbols as in FIG. 1, shows a six-phase circuit in place of a three-phase circuit. In the case of heavy duty equipment with 1000 to 10,000 amp. currents and more, such as are used for example in the electro-chemical field, it is essential to connect up a large number of valves in parallel, because the rated current of present-day single valves is roughly 100 amp. and, in consequence, there can be produced with an arrangement according to FIG. 1, 300 amp. direct current and 600 amp. direct current with an arrangement according to FIG. 2. Normally, the numerous rectifier sets arranged in parallel are fed by a common transformer. If in such a case a disturbance occurs, for example, the failure of a valve, then the rectifier will be loaded due to the comparatively strong short-circuit current. It is therefore necessary to protect the individual valves, by means of quick-acting fusible cut-outs, against excess currents, and to provide for facilities which make possible a uniform distribution of current (for example, series impedances). These measures increase the cost of the equipment and impair its efficiency.

The said shortcomings can be overcome if the transformer in question is equipped, for the purpose of feeding each single valve set, with a separate primary winding and a pertaining separate secondary winding whose stationary effective short-circuit current does not exceed the short-time permissible load current of a valve set, and when a quick-acting switch is provided in the transformer primary circuit. The short-time permissible excess current of a valve set is about 25 times that of the normal current. The advantage of the invention is that, because of the reduced transformer short-circuit current on the numerous current distributors the current-limiting impedances and the fusible metal cut-outs can be dispensed with. In the event of a disturbance the primary switch, which becomes operative in about 1/10 of a second, disconnects the system from the line before any damage is done to the rectifier.

Figure 3:
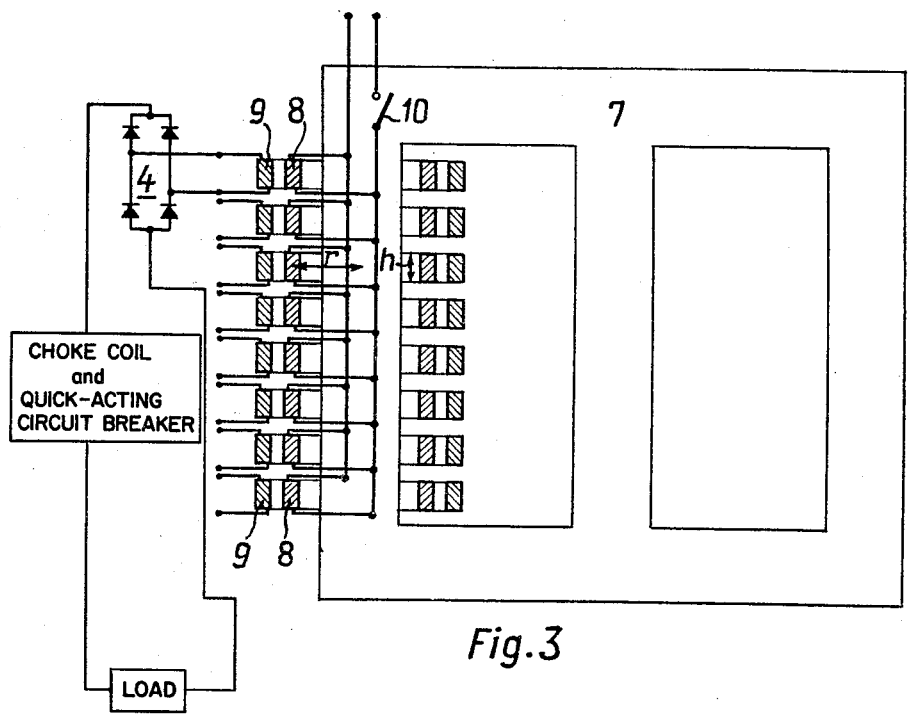
FIG. 3 is a diagrammatic view of a transformer constructed in accordance with the present invention.
Figure 4:
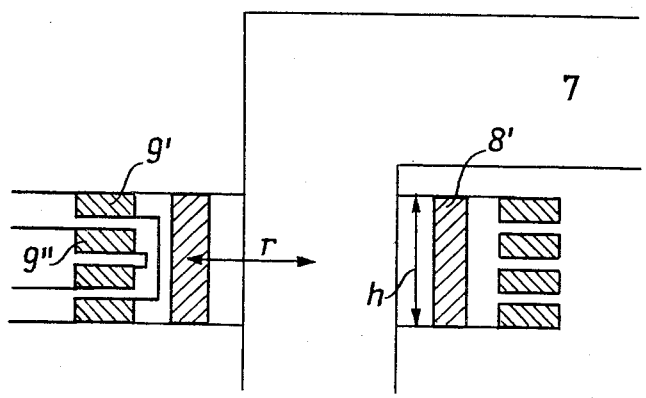
FIG. 4 is a diagrammatic view showing an alternative construction.

FIGS. 3 and 4 show transformers, in accordance with the present invention, in a simplified form. In FIG. 3 the iron body of the transformer is denoted by 7, 8 are parallel-connected phases of the high-voltage primary windings which act on the rectifier sets 4, and 10 is the primary switch. The radius is indicated by $r$, and $h$ is the extension of the high-voltage winding in the direction of the core axis of the transformer. According to FIG. 3, each secondary winding has a separate primary winding. But provision can also be made for every two secondary windings, 9' and 9", to have a separate primary winding 8', as shown in FIG. 4. In the latter figure the secondary windings are so arranged that, in the event of any disturbance, an increased magnetic dispersion occurs. In both FIGS. 3 and 4 the radius $r$ of the separate high-voltage winding is, with due regard for a possible high reactance, greater than the extension $h$ of the winding in the direction of the core axis of the transformer.

In order to be able, in the event of valve trouble, to limit the rise in the reverse current, a good purpose may be served by fitting in the connections on the direct-current side of each set of valves a choke coil together with a quick-acting disconnecting device.

Figure 5:
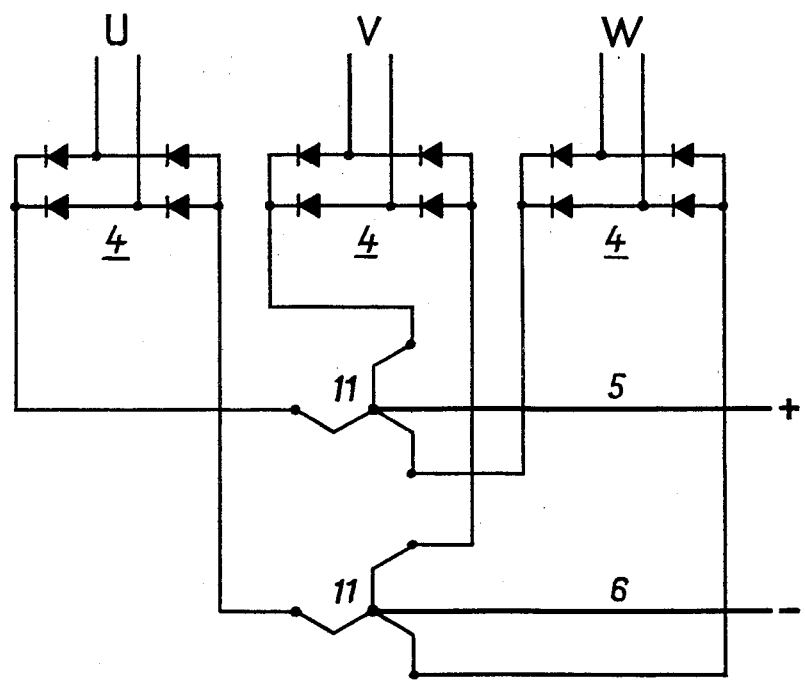
FIG. 5 is a diagrammatic view of a rectifier circuit provided with drainage coils.

Lastly, it is an advantage to make provision for the already known drainage coils 11, which are in connection with the valve sets 4, as shown in FIG. 5.

Attention must be drawn to the fact that the transformers in question are not more expensive than those hitherto used, as these, for the indicated purpose, have conductors constantly connected in parallel.

Having now particularly described and ascertained the nature of my said invention and in what manner the same is to be performed, I declare that what is claimed is:

In a high voltage rectifier installation for use with a direct current load, a plurality of rectifier-valve sets each composed of independent single-crystal semi-conductor valves, each of said sets being connected to the load through a choke coil and a quick-acting circuit breaker, a transformer comprising a magnetic core, a plurality of separate primary windings arranged along said core and connected in parallel, each of said primary windings having an annular form with an average radius greater than the width of the form in the direction of the core axis, and a plurality of separate secondary windings, there being at least one secondary winding in operative adjacence to each primary winding, each of said secondary windings being connected to a different one of said valve sets.

References Cited in the file of this patent

UNITED STATES PATENTS

| | | |
|---|---|---|
| 529,152 | Zickermann | Nov. 13, 1894 |
| 680,421 | Sutter et al. | Aug. 13, 1901 |
| 728,970 | Peck | May 26, 1903 |
| 2,193,083 | Winograd | Mar. 12, 1940 |
| 2,442,021 | Rose | May 25, 1948 |
| 2,489,697 | Brandt | Nov. 29, 1949 |
| 2,813,243 | Christian et al. | Nov. 12, 1957 |
| 2,830,255 | De Blasio | Apr. 8, 1958 |
| 2,918,616 | Diebold | Dec. 22, 1959 |

FOREIGN PATENTS

| | | |
|---|---|---|
| 281,680 | Great Britain | July 4, 1928 |